United States Patent [19]
McCracken

[11] 3,837,283
[45] Sept. 24, 1974

[54] ACTIVE OPTICAL FUZE

[75] Inventor: Robert H. McCracken, Montgomery County, Md.

[73] Assignee: The United States of America as represented by the Secretary of the Army, Washington, D.C.

[22] Filed: Aug. 3, 1973

[21] Appl. No.: 385,381

[52] U.S. Cl. .......................................... 102/70.2 P
[51] Int. Cl. ............................................ F42c 13/02
[58] Field of Search ............... 102/70.2 P; 244/3.16; 343/7 PF

[56] References Cited
UNITED STATES PATENTS

| | | | |
|---|---|---|---|
| 3,129,424 | 4/1964 | Rabinow | 102/70.2 P |
| 3,455,243 | 7/1969 | Martin | 102/70.2 P |
| 3,554,129 | 1/1971 | Alpers | 102/70.2 P |
| 3,741,111 | 6/1973 | Brenner | 102/70.2 P |

Primary Examiner—Benjamin A. Borchelt
Assistant Examiner—C. T. Jordan
Attorney, Agent, or Firm—Edward J. Kelly; Saul Elbaum

[57] ABSTRACT

An active optical fuze is provided for detecting the transit of a target through a given focal plane and energizing a firing circuit in response to such event. A pair of optical transmitters are alternately pulsed at a known pulse frequency to illuminate two related foci on an approaching target. When the target is not at the focal plane a pair of optical receivers receive light reflected from both foci in-phase. When, however, the target is at the focal plane, the two receivers are illuminated out of phase by only corresponding ones of said foci. In this latter mode of illumination the receivers drive, respectively, the SET and RESET terminals of a bistable multivibrator to thereby generate a firing signal of the same known pulse frequency as that driving the transmitter, which firing signal is then applied to a detecting and firing circuit to energize the latter as the target transits the focal plane.

8 Claims, 5 Drawing Figures

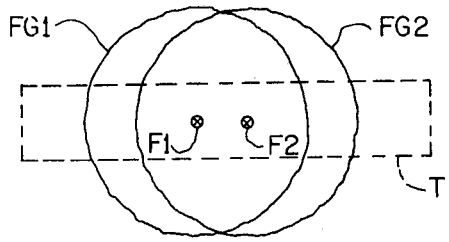
FIG. 1A  OVERLAPPED TRANSFOCAL GLOBS
FIG. 1B  RESOLVED FOCI
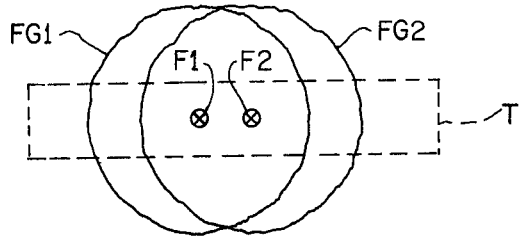
FIG. 1C  OVERLAPPED CISFOCAL GLOBS
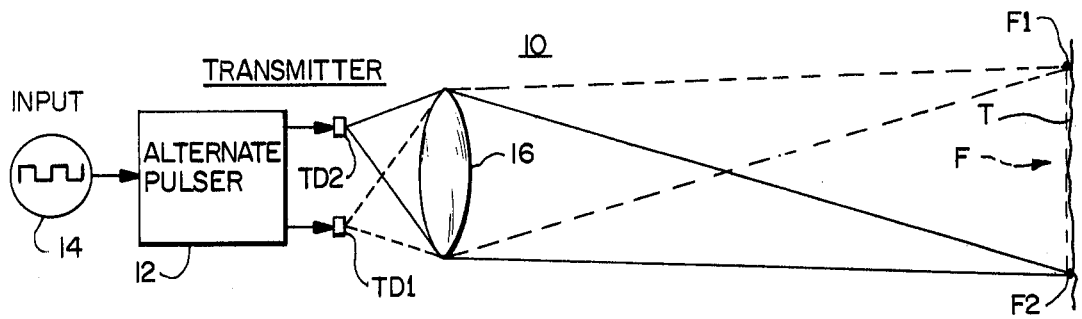
FIG. 2A
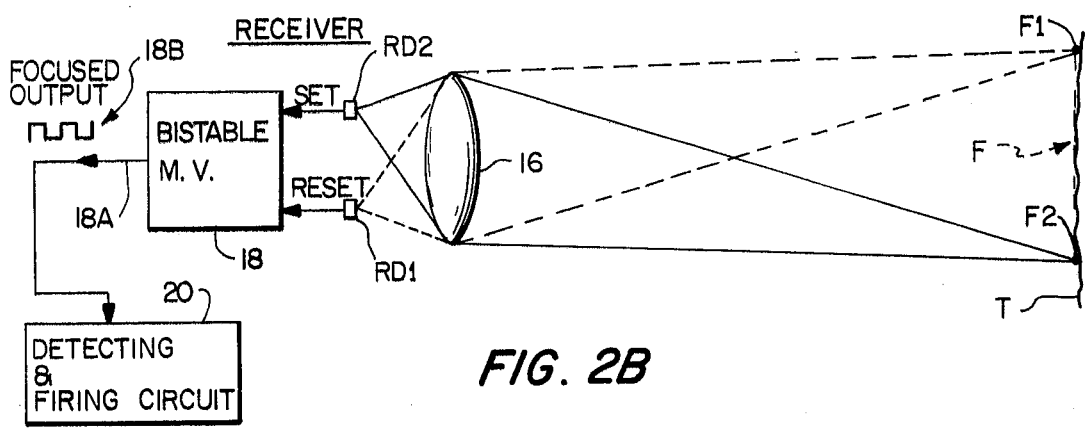
FIG. 2B

ACTIVE OPTICAL FUZE

RIGHTS OF THE GOVERNMENT

The invention described herein may be manufactured, used, and licensed by or for the United States Government for governmental purposes without the payment to me of any royalty thereon.

This invention relates to proximity devices and more particularly to an optical target detection means for indicating the passage of a moving target through a predetermined focal plane.

BACKGROUND OF THE INVENTION

Optical proximity fuzes which detect the transit of a target through a predetermined focal plane has been attempted by such proposals as differentiating between a focussed spot in the plane and an unfocussed spot outside of the plane by the greater "brilliance" of the focussed spot.

However, when photodetectors are utilized for such a form of detection there is no meaningful difference between focussed and unfocussed spots or images. This results from the fact that at a photocathode the creation of electron-hole pairs is a function of the energy of photons incident on the photocathode rather than on the relative incident positions thereof.

Therefore, spurious response of such a proximity fuze can be caused by the normal inverse-square intensity relation of photodetector response, irrespective of focussing, thereby rendering meaningless a preset focal distance.

One detectable and usable mode difference, however, between a focussed image and an unfocussed image is order rather than the undependable variable amplitude mode associated with intensity or energy.

Since order is meaningless in a homogeneous situation, one must have at least two image elements and then provide the means to utilize this parameter for the detection of the transit of that image through a given focal plane.

OBJECTS OF THE INVENTION

It is, therefore, an object of the present invention to provide new and novel optical proximity means detecting the transit of a target through a given focal plane.

It is another object of the present invention to provide a new and novel active optical fuze generating a control output in response to the transit of a target through a given focal plane.

Another object of the present invention is to provide a new and novel active optical fuze which is substantially immune to optical countermeasures.

Yet another object of the present invention is to provide a new and novel active optical fuze which coordinates the detection of at least two independent foci on a given target to determine the order of said foci as an indication of the coincidence and/or transit of said target through a given focal plane.

These and other objects of the present invention will become more fully apparent with reference to the following specification and drawings which relate to a preferred embodiment of the present invention.

IN THE DRAWINGS:

FIG. 1A is a diagram representing the condition of a target beyond the focal plane of the present invention;

FIG. 1B is a diagram representing the focussed condition, i.e., the transit of a target through the focal plane of the present invention;

FIG. 1C is a diagram representing the condition of a target between the focal plane of the present invention and the detector means of the present invention;

FIG. 2A is a block diagram of a preferred embodiment of the optical transmitter of the fuze of the present invention; and FIG. 2B is a block diagram of a preferred embodiment of the optical receiver and firing circuit means of the fuze of the present invention.

SUMMARY OF THE INVENTION

At least two optical transmitters such as laser diodes or light emitting diodes are pulsed alternately through suitable optical means to create individual foci at an approaching target. Optical receiving means (photodetectors) adjacent respective ones of the transmitters are related to the optical system such that when the target transits a predetermined focal plane or range of focal planes the photodetectors see only respective ones of the said foci.

By alternately pulsing the transmitters at a given frequency and by driving a bistable multivibrator or its equivalent between its respective SET and RESET states by the respective ones of said photodetectors if two such detectors are used, then at focus, i.e., when the target transits the focal plane the said detectors will be illuminated out of phase and a trigger or firing signal of said given frequency will be generated by the said multivibrator. In the out-of-focus condition, i.e., target TOO FAR or target TOO CLOSE, both the photodetectors will be illuminated in phase by either of the foci and the proper trigger signal will not be generated.

Therefore, even if the proper frequency is generated by a countermeasure device it will only be effective at the focal plane and will thus be ineffective.

Referring in detail to the drawings and more particularly to FIGS. 1A, 1B and 1C, the pair of distinct foci F1 and F2 are shown on a target object T, with the said foci surrounded by respective focal globs FG1 and FG2 which are in an overlapped transfocal state when the target T is TOO FAR from the proximity fuze of the present invention (FIG. 1A) and are in an overlapped cisfocal state when the target T is TOO CLOSE (FIG. 1C).

The focal globs FG1 and FG2 represent the field of view of a pair of respective photodetectors, which will be hereinafter described with reference to FIG. 2. Therefore, FIGS. 1A and 1C illustrate that in the TOO FAR or TOO CLOSE condition the foci F1 and F2 on the target T are viewed by both such photodetectors.

In the focussed condition of FIG. 1A, however, the focal globs FG1 and FG2 are no longer in evidence indicating that the foci F1 and F2 on the target T are only viewed by their respectively associated photodetectors and the order indicating the transit of the target T through the focal plane of the proximity device of the present invention has been established.

With the foregoing parameters of detection now explained, reference is made to FIGS. 2A and 2B in which an active optical fuze 10 of the present invention is illustrated.

The fuze 10 is shown as including first and second optical transmitters TD1 and TD2 alternately driven at a predetermined frequency (such as 4 kilocycles) by an alternate pulser-driver circuit 12 of any suitable known type adapted to alternately dirve laser diodes or light emitting diodes constituting the said optical transmitters at the said predetermined frequency. A synchronizing square wave input means 14 of any suitable type known in the art is used to trigger the alternate pulser-driver circuit 12.

The light emitted from the optical transmitters TD1 and TD2 through suitable optics 16 form respective foci F1 and F2 on the target T, which, in FIGS. 2A and 2B is shown located at the focal plane F.

First and second optical receiving means RD1 and RD2 correspond, respectively, to the first and second transmitters TD1 and TD2 and the foci F1 and F2 and are located with respect to the optics 16 such that they receive the reflected light energy from the foci F1 and F2 in the format explained in FIGS. 1A, 1B and 1C.

Accordingly, at the position shown for the target T in FIGS. 2A and 2B, the first optical receivers RD1 and RD2 receive reflected light from only their respective foci F1 and F2. These optical receivers comprise suitable photodetector diodes or the like.

The optical receiver RD1 and RD2 in the preferred embodiment shown drive the RESET and SET inputs, respectively, of a suitable bistable multivibrator 18, the latter having an output terminal 18A which exhibits a square wave output 18B of the said predetermined frequency of the transmitters when the said target T is at the focal plane F of the optics 16.

This output is applied to a suitable detecting and firing circuit 20 which thus responds to the coincidence of the said target T and focal plane F to energize any suitable associated warhead or other device.

In operation, assuming a target T approach velocity relative to the focal plane F of 1,000 feet/second, the predetermined 4KHz transmitting frequency will result in alternate transmitted pulses of light from the optical transmitters TD1 and TD2 at 3-inch intervals of relative travel for the target T or 1 ½ inch intervals for successive pulses. Thus, the resolution and accuracy are seen to be readily optimized with greater frequencies to any desired practical extent.

As the target T reaches the focal plane F, the optical receivers RD1 and RD2 respond individually to the reflected light pulses from only their respective foci F1 and F2, thus driving the RESET and SET terminals of the bistable multivibrator 18 to produce a 4KHz (predetermined frequency) output signal 18B on the output 18A and energizing the detecting and firing circuit 20.

In the TOO FAR or TOO CLOSE condition of the Target T relative to the focal plane F the optical receivers are both energized in-phase by the reflected light pulses from either of the two foci F1 and F2 as they occur due to the overlap in the field of view of the said receivers through the optics 16 as illustrated in FIGS. 1A and 1C.

Due to this in-phase energization, no 4KHz (predetermined frequency) signal 18B can be generated and the detecting and firing circuit 20 will not be energized.

It is at this point that the resistance to countermeasures such as optical jamming of the fuze 10 becomes readily apparent. For instance, even if illumination of the correct pulse frequency of 4KHz is on the optical receivers RD1 and RD2 the order of that illumination cannot be made compatible with the fuze 10. This is due to the fact that such externally applied illumination will be viewed or detected simultaneously (in-phase) by the optical receivers RD1 and RD2 and thus, the correct firing signal 18B cannot be generated.

I wish it to be understood that I do not desire to be limited to the exact details of construction shown and described, for obvious modifications can be made by a person skilled in the art.

I claim:

1. Optical fuze means providing an output signal in response to the transit of a target through a predetermined focal plane, comprising:
    optical transmitter means alternately illuminating first and second foci on said target at a predetermined frequency; and
    optical receiving means selectively responding to reflected illumination from each of said foci to generate a firing signal of said predetermined frequency only when said target transits said focal plane and collectively responding to said reflected illumination from both said foci at substantially all other relative positions of said target and said focal plane.

2. The invention defined in claim 1, wherein said fuze means further includes detecting and firing circuit means selectively responsive to said firing signal.

3. The optical fuze means defined in claim 1, wherein said optical transmitter means comprises alternate pulser-driver means driven at said predetermined frequency; first and second light emitting means alternately driven by said pulser-driver means to emit first and second alternating trains of light pulses; and optical means transmitting said first and second pulse trains, respectively, to said first and second foci.

4. The optical fuze means defined in claim 3, wherein said fuze means further includes detecting and firing circuit means selectively responsive to said firing signal.

5. The optical fuze means defined in claim 1, wherein said optical receiving means comprises first and second photodetector means responding exclusively to reflected illumination from said first and second foci, respectively, when said target transits said focal plane and collectively to said illumination from said foci at said substantially all other relative positions of said target and focal plane; and bistable circuit means driven between first and second stable states thereof by said first and second photodetector means when said target transits said focal plane and generating said firing signal of said predetermined frequency in response thereto.

6. The optical fuze means defined in claim 5, wherein said fuze means further includes detecting and firing circuit means selectively responsive to said firing signal.

7. The optical fuze means defined in claim 1, wherein said optical transmitter means comprises alternate pulser-driver means driven at said predetermined frequency; first and second light emitting means alternately driven by said pulser-driver means to emit first and second alternating trains of light pulses; and optical means transmitting said first and second pulse trains, respectively, to said first and second foci; and wherein said optical receiving means comprises first and second photodetector means responding exclusively to reflected illumination from said first and second foci, respectively, when said target transits said focal plane and collectively to said illumination from said foci at said substantially all other relative positions of said target and focal plane; and bistable circuit means driven between first and second stable states thereof by said first and second photodetector means when said target transits said focal plane and generating said firing signal of said predetermined frequency in response thereto.

8. The optical fuze means defined in claim 7, wherein said fuze means further includes detecting and firing circuit means selectively responsive to said firing signal.

* * * * *